United States Patent Office 3,126,313
Patented Mar. 24, 1964

3,126,313
TREATMENT OF METAL SURFACES TO PLACE
FINELY DIVIDED SULFUR THEREON
Carl E. Johnson, Glen Ellyn, Ill., assignor to Nalco Chemical Company, a corporation of Delaware
No Drawing. Filed Mar. 9, 1959, Ser. No. 797,873
2 Claims. (Cl. 167—20)

This invention relates to a method of treating solid surfaces to place thereon a coating of finely divided sulfur. More specifically, the invention deals with chemical compositions which when diluted with water will release finely divided sulfur which is extremely useful in many industrial processes.

It is common practice to use finely divided sulfur in many phases of industry, agriculture, and domestic enterprise. For most applications it is desirable to sulfur coat surfaces in the form of very finely divided particles so that maximum surface contact is obtained. Examples of where this type treatment is desirable are such fields as metal lubrication, drilling fluids, shampoo formulations, agricultural pesticides, corrosion inhibition, anti-stripping agents for asphalt, antifoam formulations, and many others which are well known to the art.

Elemental sulfur may be applied to surfaces for various purposes. As a fine powder it is extremely difficult to uniformly apply and is not entirely satisfactory. One method of utilizing colloidal sulfur is to place it into a solvent system which is then coated upon a particular surface and is allowed to dry which precipitates the sulfur onto the surface. Liquid formulations are desirable for a number of reasons. For the most part, the desirability is based on the ease of application and the ability to control the precipitation of the sulfur to the surface treated. This release may be controlled by the type of solvent or the type of solvent-sulfur complex containing compound that is used, but in many instances, it is necessary to choose a particular solvent or sulfur complex type system to achieve a specific effect.

It would be an extremely valuable contribution to the art of a sulfur-containing material were readily available which was primarily a liquid material and could be formulated into a number of useful products for various applications in industry and commerce. Such a product should be simple to prepare, have a wide range of uses, and yet be capable of simple modification whereby the release of sulfur could be uniformly controlled under a large number of application circumstances.

This invention affords a method of preparing numerous sulfur-containing complexes which are valuable in many fields of industry and commerce, and which may be readily modified in their chemical and physical properties.

The compositions of the invention are prepared by dissolving from 1% to 50% by weight of elemental sulfur in a polyamine, and then reacting the two ingredients under such circumstances whereby the type of product produced may be varied.

By varying the reaction conditions under which the compositions of the invention are prepared, it is possible to produce amine-sulfur complexes which may be readily controlled by the addition of water, heat, or pressure to release the sulfur under controlled conditions. This advantage is considered to be of primary importance when products are used in formulating specific types of commercial and industrial compositions.

The polyamines which are used to prepare the compositions of the invention may be derived from a number of well-known materials of which the following compounds are illustrative.

Ethylene diamine
1,2-diamino propane
1,3-diamino propane
1,2-propylene diamine
1,3-propylene diamine
1,3-diamino butane
Decamethylene diamine
Diethylene triamine
Tetraethylene pentamine
N-butyl ethylene diamine
3-dimethyl amino propylamine
N,N,N,N-tetra methyl-1,3-butyl amine
1,3-diamino propanol dihydroxy ethylene diamine
Amino ethyl ethanol amine
N-(1,1-dimethyl-2-hydroxy ethyl)-2-methyl-1,2-propane diamine
N,N-diethyl-2-hydroxy-1,6-hexyldiamine
Tetra hydroxyethyl ethylene diamine
N-hydroxy ethyl diethylene triamine From the above it becomes apparent that the compound may be readily divided into the classification of alkylene polyamines, polyalkylene polyamines, hydroxy alkyd alkylene polyamines, hydroxy alkyl polyalkylene polyamines.

For the most part, the sulfur is soluble in the above amines such that as much as 50% by weight may be incorporated into these amines without using any heat or using only a mild amount of heat to effect solution. What is surprising is that the sulfur may be complexed with the amines in varying degrees insofar as they are affected by water release, which phenomena will be explained later, by heating the products at varying temperatures for various periods of time to effect a more complete reaction.

Thus, for instance, the complex may be formed instantaneously upon the sulfur being dissolved in the amine or a more strongly bonded sulfur-amine complex may be prepared by heating the amine-sulfur solution for a relatively short or long period of time depending upon the particular end application sought. As a general rule, the temperatures used to prepare the compositions useful in the invention vary from 10° C. to as high as the boiling point of the particular amine used. The reaction times vary from an almost instantaneous reaction occurring simultaneously with dissolution of the sulfur in the polyamine to a period of eight hours. It will be understood that in the type of complex formed properties may be modified by varying either the temperature at which the sulfur solution is reacted as well as the time of the reaction. As a general rule, the higher the temperature and the longer the reaction time, the more rigidly bound will the sulfur become with the amine; hence, the more stable will be the resultant product.

Using the general reaction conditions set forth above, all of the compositions of the invention will form materials which are soluble in water. In the case of low temperature reaction products, the resultant products will dissolve in water and will immediately begin to throw out sulfur in the form of a fine particle suspension. The higher temperature, longer term reaction products will form solutions in water that are stable for long periods of time.

Perhaps one of the most interesting features of these compounds is that the rate at which sulfur will be thrown out from aqueous solutions of these materials is not only dependent upon conditions under which these compounds are prepared but also the amount of water with which the composition is in contact. For instance, a polyamine-sulfur complex containing 10% by weight of sulfur may be completely soluble in a 20% by weight aqueous solution but if diluted down to 2%, the sulfur is immediately thrown out in the form of a finely divided colloidal precipitate which is readily stable and may be kept in suspension by using mild agitation. Thus, it will be seen that the compositions of the invention may be controlled insofar as their sulfur release in water is concerned by the addition of water in controlled amounts to cause precipitation.

From the above considerations, it will be apparent that the compositions of the invention may be employed in a number of applications where the treatment of surfaces with colloidal or finely divided sulfur is desired. One of the more unique applications for the compositions of the invention is the preparation of so-called dandruff removing type shampoos. When preparing such formulations, it is common to use such ingredients as one or more wetting agents in conjunction with water. When used in such formulations, the amine-sulfur complexes are employed at concentrations ranging from 1% to 5% by weight in the formula, the preferred amount being about 2% by weight. The amount of sulfur contained in the amine-sulfur complex may be as little as 3% by weight or as high as 30% by weight, but suitable dandruff removing shampoo formulations may be afforded by using 10 grams of sulfur per 100 grams of amine.

The formulations should contain sufficient amounts of the amine-sulfur complex whereby the composition is stable. As the shampoo is applied to the hair and brought to a lather by the addition of water, the sulfur contained in the amine-sulfur complex precipitates out on the hair and scalp, thus affording a protection against subsequent dandruff as well as removing any dandruff already present.

Another important use for the compositions is in the formulation of metal working lubricants particularly cutting oils and water-soluble lubricants of all types. When used as a cutting oil, the compositions of the invention would be formulated with lubricating base oils and other ingredients such as lard oil, fatty acids, and the like to produce homogeneous formulations which would tend to provide substantial quantities of reactive sulfur which coats the metal surfaces, thus providing an iron-sulfide type complex which is known to be beneficial in extreme pressure lubrication applications. When it is desired to formulate the compositions of the invention with water-dispersible cutting oils, the compositions of the invention would be formulated with lubricating base stocks and emulsifying agents which would allow the compositions to be dispersed in water. In these lubricating applications, it will, of course, be understood that the products, since they are water-soluble, may be used either alone or in conjunction with other water-dispersible or emulsifiable lubricants.

The compositions of the invention also find usefulness in such fields as the treatment of all types of useful vegetation to prevent fungus infection. In this application, the highly complexed sulfur type composition would be used as produced or it may be added to water or other polar solvent to facilitate spraying the area to be treated. After contacting the plant foliage and the ground, precipitation, watering, and the like would slowly release the sulfur from the sulfur-amine complex thus affording a rather continuous and beneficial release of sulfur to the area treated.

In a similar fashion, the amine-sulfur complexes of the invention may be blended with asphalts whereby the anti-stripping properties of the asphalts are substantially improved. The chief benefit derived by this type of utilization of the compositions, is that when the asphalt is laid during wet or rainy weather the moisture will tend to gradually release the sulfur which will form a bond between the asphalt and the aggregate to be coated. The most beneficial results are achieved when the amine-sulfur complexes are combined with additives such as fatty acid salts or amines of polyamines.

In addition to having usefulness in the areas thus specified, the materials are also useful in the fields of corrosion inhibition, gasoline additives, drilling fluids, and the like, or in any other field of endeavor in which it is desirable to treat a surface with finely divided sulfur where it is beneficial to have the sulfur released at a given time or under a given, controlled set of circumstances. For purposes of further illustrating the invention, the following examples are presented.

EXAMPLE I

This illustrates how the amine-sulfur complexes of the invention may be either loosely or tightly complexed depending upon the conditions of the reaction. In this experiment, 500 grams of diethylene triamine were combined with 50 grams of sulfur and were mixed together at room temperature, viz., 72°±5° F. Heat was applied over a two-hour period. Ten milliliter aliquots were withdrawn and diluted with 50 milliliters of water during the course of the reaction to determine the various types of complexes which could be prepared. The results of these experiments are presented below in Table 1.

Table 1

| Comp. No. | Time of Heating, Minutes | Temperature, °C. | Results After H₂O Addition |
| --- | --- | --- | --- |
| I | 0 | 32 | Complete precipitation at once. |
| II | 5 | 71 | Precipitation from yellow-red solution starts at once and continues. |
| III | 15 | 83 | Red-orange clear solution; Precipitation starts after 12 hours. |
| IV | 30 | 89 | Red-brown clear solution, same as above. |
| V | ¹ 60 | 89 | Red-orange solution with beads of oil. |
| VI | ¹ 120 | 85 | Do. |

¹ Allowed to stand at room conditions for three days after addition of water. No sulfur precipitation.

From the above it will be seen that at room temperature, the sulfur dissolved in the amine and when added to water, tends to form a precipitate. This also occurs when the heating time is five minutes and the temperature was elevated to 71° C. Elevated temperatures and longer reaction times tended to form different type reaction products which had varying precipitation characteristics over those prepared at lower temperatures for shorter periods of time. In all of the above products, the sulfur could be caused to precipitate by large dilutions with water as well as with the products being allowed to age for varying periods of time under different solution concentrations. From the above, it will be seen that it is a relatively simple matter to prepare sulfur-amine complexes having the ability to readily release sulfur in the form of a finely divided colloid in the presence of water under a wide variety of dilution conditions.

EXAMPLE II

Using the same conditions as Example I, sulfur was added to N-hydroxy ethyl diethylene triamine. The results of these tests are presented in Table 2 below:

*Table 2*

| Comp. No. | Time of Heating, Minutes | Temperature, °C. | Results After H₂O Addition |
|---|---|---|---|
| VII | 0 | 30 | Clear yellow solution; Much sulfur floating; Sulfur came out at once and floated. |
| VIII | 5 | 72 | Heavy yellow suspension. |
| IX | 10 | 77 | Heavy yellow suspension; Less perhaps than VIII. |
| X | 20 | 85 | Clear yellow solution; Trace of sulfur floating; Sulfur precipitates. |
| XI | 30 | 87 | Essentially same as above. |
| XII | ¹45 | 90 | Clear yellow-orange solution. |
| XIII | ¹60 | 90 | Same as above. |
| XIV | ²120 | 90 | Clear yellow-orange solution. |

¹ Very small amount of sulfur precipitated after standing for 3 days.
² Trace of sulfur precipitated after standing for 3 days.

EXAMPLE III

To further illustrate the compositions of the invention, using the techniques of Example I, the following amine-sulfur complexes were prepared. In each instance, only enough heat was used to completely dissolve the sulfur. Table 3 lists these compositions.

*Table 3*

| Comp. No. | Amine | Sulfur Solubility in the Amine | Percent S | Water Solubility |
|---|---|---|---|---|
| XV | 1,3-diamino propanol | Incomplete solution | 60 | Gives precipitate. |
| XVI | dihydroxy ethylene diamine | Dissolves sulfur | 72 | Water insoluble. |
| XVII | aminoethyl ethanol amine | Dissolves sulfur completely | 25 | Water gives precipitate. |
| XVIII | N-(1,1-dimethyl-2-hydroxy-ethyl)-2-methyl-1,2-propane diamine. | Dissolves sulfur | 2 | Water gives immediate precipitation. |
| XIX | N,N-diethyl-2-hydroxy-1,6-hexyldiamine. | Solution of sulfur gives viscous oil. | 30 | Water produces fine precipitate on standing. |
| XX | tetra hydroxy ethyl ethylene diamine. | Dissolves sulfur but some sulfur comes out on cooling. | 5 | Water gives precipitate. |
| XXI | ethylene diamine | Dissolves sulfur completely | 50 | Water soluble. |
| XXII | 1,2-diaminopropane | do | 20 | Do. |
| XXIII | 1,3-diaminopropane | do | 15 | Do. |
| XXIV | propylene diamine | do | 10 | Do. |
| XXV | 1,3-diamino butane | do | 15 | Do. |
| XXVI | decamethylene diamine | Dissolves sulfur completely after melted. | 35 | Water causes surface precipitation of sulfur. |
| XXVII | diethylene triamine | Dissolves sulfur rapidly | 15 | Water soluble. |
| XXVIII | tetra ethylene pentamine | Dissolves sulfur completely | 10 | Do. |
| XXIX | N-butyl ethylene diamine | Dissolves sulfur rapidly but solution is complete only with heating. | 20 | Water gives precipitate. |
| XXX | 2-dimethylamino propylamine. | Dissolves sulfur rapidly | 30 | Water gives a yellow precipitate. |
| XXXI | N,N,N,N-tetra methyl-1,3-butyl diamine. | Dissolves sulfur completely | 45 | Water gives dirty precipitate. |

To illustrate some typical products which may be used in several of the applications previously described, the following formulas are given for purposes of demonstrating the utility of the invention.

FORMULA I

*Shampoo*

| Ingredients: | Percent by weight |
|---|---|
| Sodium lauryl sulfonate | 15 |
| Oleic acid salt of amino ethyl ethanol amine | 8 |
| Composition IX, Table 2 | 2 |
| Water | 75 |

*Cutting Oil*

| Ingredients: | Percent by weight |
|---|---|
| 100 seconds paraffin base oil | 75 |
| Composition No. V, Table 1 | 25 |

*Rose Dust*

| Ingredients: | Percent by weight |
|---|---|
| Composition No. VIII, Table 2 | 55 |
| Water | 45 |

*Corrosion Inhibitor*

| Ingredients: | Percent by weight |
|---|---|
| Composition XXI, Table 3 | 20 |
| Borax | 10 |
| Water | 45 |

*Asphalt Anti-stripping Agent*

| Ingredients: | Percent by weight |
|---|---|
| Composition XXVII, Table 3 | 20 |
| 1,2-hydroxy ethyl-2-heptadecyl imidazoline tall oil salt | 80 |

*Drilling Fluid*

| Ingredients: | Percent by weight |
|---|---|
| Water | 67.5 |
| Bentonite | 3 |
| Barium sulfate | 25 |
| Starch | 3 |
| Sodium hexametaphosphate | .5 |
| Pentachlorophenol (sodium salt) | .5 |
| Composition XXX, Table 3 | .5 |

The above compositions are used in accordance with known methods for incorporating agents used for similar purposes which are now known to the art. It will be understood that while many amine sulfur complexes have been reported in the literature, no mention has been made of the fact that it is possible to produce materials whose ability to release sulfur may be controlled by the amount of water added to the compositions. In many instances prior art amine-sulfur complexes are either water insoluble or are of such a physical nature that it is extremely difficult to incorporate them into formulations. In the case of those that are water soluble, the resultant products tend to throw out sulfur immediately and it is impossible to control the deposition rate on the particular surface to be treated.

I claim:

1. In a method of depositing finely-divided sulfur upon a solid surface wherein said solid surface is treated with a polyamine-sulfur complex and an amount of water at least sufficient to release finely-divided sulfur from said complex, the improvement which comprises stabilizing said polyamine-sulfur complex prior to application thereof to said surface to provide a delayed release of said sulfur upon contact of said complex with said amount of water by heating a mixture of sulfur and a polyamine selected from the group consisting of alkylene diamines, polyalkylene polyamines, hydroxyalkyl alkylene diamines and hydroxyalkyl polyalkylene polyamines at a temperature in the range of about 83° C. up to the boiling point of said polyamine for a period of time ranging from about 15 minutes up to about 8 hours and sufficient to form a polyamine-sulfur complex which is stable enough so that it will release finely divided sulfur slowly upon contact of said complex with water, said complex being rendered more stable against said release of sulfur with increasing temperatures and times of said heating of said sulfur and said polyamine, said sulfur in said complex constituting 1–50% by weight based on the total weight of said complex.

2. In a method of depositing finely-divided sulfur upon a solid surface wherein said solid surface is treated with a polyalkylene polyamine-sulfur complex and an amount of water at least sufficient to release finely-divided sulfur from said complex, the improvement which comprises stabilizing said polyalkylene polyamine-sulfur complex prior to application thereof to said surface to provide a delayed release of said sulfur upon contact of said complex with said amount of water by heating a mixture of sulfur and a polyalkylene polyamine at a temperature in the range of about 83° C. up to the boiling point of said polyalkylene polyamine for a period of time in the range of 15–120 minutes and sufficient to form a polyalkylene polyamine-sulfur complex which is stable enough so that it will release finely-divided sulfur slowly upon contact of said complex with water, said complex being rendered more stable against said release of sulfur with increasing temperatures and times of said heating of said sulfur and said polyalkylene polyamine, said sulfur in said complex constituting 1–50% by weight based on the total weight of said complex.

References Cited in the file of this patent

UNITED STATES PATENTS

| | | |
|---|---|---|
| 1,913,299 | Abrams | June 6, 1933 |
| 2,006,756 | Bartram | July 2, 1935 |
| 2,136,017 | Norman | Nov. 8, 1938 |
| 2,306,971 | McConnell | Dec. 29, 1942 |
| 2,333,061 | Van Over | Oct. 26, 1943 |
| 2,458,764 | Brunel | Jan. 11, 1949 |
| 2,543,061 | Rider et al. | Feb. 27, 1951 |
| 2,655,478 | Deuster et al. | Oct. 13, 1953 |
| 2,694,669 | Baldwin et al. | Nov. 16, 1954 |
| 2,718,501 | Harle | Sept. 20, 1955 |
| 2,775,559 | Himel et al. | Dec. 25, 1956 |
| 2,736,658 | Pfohl et al. | Feb. 28, 1956 |
| 2,762,697 | Doerr | Sept. 11, 1956 |

---

UNITED STATES PATENT OFFICE

CERTIFICATE OF CORRECTION

Patent No. 3,126,313             March 24, 1964

Carl E. Johnson

It is hereby certified that error appears in the above numbered patent requiring correction and that the said Letters Patent should read as corrected below.

Column 2, line 30, for "alkyd" read -- alkyl --.

Signed and sealed this 21st day of July 1964.

(SEAL)

Attest:

ESTON G. JOHNSON
Attesting Officer

EDWARD J. BRENNER
Commissioner of Patents

UNITED STATES PATENT OFFICE
CERTIFICATE OF CORRECTION

Patent No. 3,126,313                               March 24, 1964

Carl E. Johnson

It is hereby certified that error appears in the above numbered patent requiring correction and that the said Letters Patent should read as corrected below.

Column 2, line 30, for "alkyd" read -- alkyl --.

Signed and sealed this 21st day of July 1964.

(SEAL)

Attest:

ESTON G. JOHNSON
Attesting Officer

EDWARD J. BRENNER
Commissioner of Patents